United States Patent

Mine et al.

[11] Patent Number: 6,040,362
[45] Date of Patent: Mar. 21, 2000

[54] HEAT-CONDUCTING POLYMER COMPOSITION

[75] Inventors: Katsutoshi Mine; Osamu Mitani; Kazumi Nakayoshi; Rikako Tazawa, all of Chiba Prefecture, Japan

[73] Assignee: Dow Corning Toray Silicone Co., Ltd., Midland, Mich.

[21] Appl. No.: 09/099,636

[22] Filed: Jun. 18, 1998

[30] Foreign Application Priority Data

Jun. 20, 1997 [JP] Japan ................................ 9-180728

[51] Int. Cl.[7] .............................. C08K 9/00; C08K 3/10; C08K 3/22; C08L 83/04
[52] U.S. Cl. ..................... 523/212; 523/200; 524/428; 524/430; 524/437; 524/440; 524/441; 524/444; 524/492; 524/862; 252/518
[58] Field of Search ........................ 524/430, 437, 524/492, 862, 428, 444, 440; 523/200, 212

[56] References Cited

U.S. PATENT DOCUMENTS

| 4,855,002 | 8/1989 | Dunn et al. | 524/430 |
| 5,021,494 | 6/1991 | Toya | 524/437 |
| 5,601,924 | 2/1997 | Beane et al. | 524/428 |

FOREIGN PATENT DOCUMENTS

| 61-157587 | 7/1986 | Japan . |
| 1-215855 | 8/1989 | Japan . |
| 2060944 | 3/1990 | Japan . |
| 2-97559 | 4/1990 | Japan . |
| 4-239563 | 8/1992 | Japan . |
| 4-359060 | 12/1992 | Japan . |
| 5-105814 | 4/1993 | Japan . |
| 6-163752 | 6/1994 | Japan . |
| 8-208993 | 8/1996 | Japan . |

*Primary Examiner*—Tae Yoon
*Attorney, Agent, or Firm*—Larry A. Milco

[57] ABSTRACT

The present invention provides a heat-conducting polymer composition in which a heat-conducting metal powder is contained in a polymer, said heat-conducting polymer composition being characterized by the fact that the aforementioned powder is a metal powder which has a metal oxide layer and/or a metal nitride layer on the surfaces of the powder particles. The heat-conducting polymer composition of the present invention is characterized by the fact that said composition has a superior storage stability and thermal conductivity, and also by the fact that said composition has electrical insulating properties.

31 Claims, No Drawings

HEAT-CONDUCTING POLYMER COMPOSITION

FIELD OF THE INVENTION

The present invention concerns a heat-conducting polymer composition, and more specifically concerns a heat-conducting polymer composition which has superior storage stability and thermal conductivity.

BACKGROUND OF THE INVENTION

Heat-conducting polymer compositions can be manufactured by mixing a powder of a metal compound such as aluminum oxide (alumina) or aluminum nitride, etc., a powder of a metal such as aluminum or copper, etc., or a metal powder whose surfaces are covered by an organic resin, with a polymer.

However, heat-conducting polymer compositions which contain a powder of a metal compound such as aluminum oxide or aluminum nitride, etc., or a metal powder whose surfaces are covered by an organic resin have an insufficient thermal conductivity. In particular, such compositions have a poor storage stability, so that the above-mentioned powders precipitate during storage. Furthermore, since heat-conducting polymer compositions which contain a powder of a metal such as aluminum or copper, etc., have electrical conductivity, the uses of such compositions are limited.

SUMMARY OF THE INVENTION

The present inventors conducted diligent research concerning the above-mentioned problems. As a result, the inventors discovered that the above-mentioned problems can be solved by using a metal powder which has a metal oxide layer and/or a metal nitride layer on the surface. This discovery led to the present invention.

Specifically, the object of the present invention is to provide a heat-conducting polymer composition with superior storage stability and thermal conductivity.

The heat-conducting polymer composition of the present invention is characterized by the fact that a metal powder which has a metal oxide layer and/or a metal nitride layer on the surface is contained in a polymer as a heat-conducting metal powder.

DETAILED DESCRIPTION OF THE INVENTION

The heat-conducting polymer composition of the present invention will be described in detail.

In the heat-conducting polymer composition of the present invention, there are no restrictions on polymers with which the heat-conducting metal powder can be mixed. Examples of polymers which can be used include oil-form polymers such a mineral oils, synthetic oils and silicone oils, etc.; thermoplastic polymers such as polyethylenes, polypropylenes, polyvinyl chlorides, ethylene-vinyl acetate copolymers, ethylene-acrylic acid ester copolymers and silicone resins, etc.; and curable polymers such as curable acrylic resins, curable epoxy resins and curable polyimide resins, etc. Silicone polymers are desirable, since such polymers have a superior heat resistance; furthermore, curable silicone polymers are especially desirable.

Examples of curing mechanisms of such curable silicone polymers include hydrosilylation reactions; condensation reactions such as de-alcohol condensation reactions, de-oxime condensation reactions, dehydrogenation condensation reactions and dehydration condensation reactions, etc.; and free radical reactions using organic peroxides. Hydrosilylation reactions are especially desirable because of quick overall curing at relatively low temperatures.

Silicone polymer compositions comprising:
(A) an organopolysiloxane which has at least two alkenyl groups per molecule,
(B) an organopolysiloxane which has at least two hydrogen atoms bonded to silicon atoms per molecule, and
(C) a hydrosilylation reaction catalyst may be cited as examples of such hydrosilylation reaction curable silicone polymers.

The organopolysiloxane of component (A) is the main component of the above-mentioned composition, and must have at least two alkenyl groups per molecule. Examples of alkenyl groups which may be contained in component (A) include vinyl groups, allyl groups, butenyl groups, pentenyl groups, hexenyl groups and heptenyl groups. In particular, vinyl groups are especially desirable. Furthermore, examples of groups other than alkenyl groups which may be bonded to the silicon atoms in component (A) include substituted or unsubstituted monovalent hydrocarbon groups other than alkenyl groups, for example, alkyl groups such as methyl groups, ethyl groups, propyl groups, butyl groups, pentyl groups and hexyl groups, etc.; aryl groups such as phenyl groups, tolyl groups and xylyl groups, etc.; aralkyl groups such as benzyl groups and phenethyl groups, etc.; and halogenated alkyl groups such as 3-chloropropyl groups 3,3,3-trifluoropropyl groups, etc.; alkoxy groups such as methoxy groups, ethoxy groups and propoxy groups, etc.; and hydroxy groups. In particular, methyl groups or phenyl groups are especially desirable. Furthermore, there are no restrictions on the molecular structure of component (A); examples of molecular structures which may be used include linear structures, linear structures with some branching, branched structures and network structures. Likewise, there are no restrictions on the viscosity of component (A); for example, a viscosity in the range of 0.050 to 500 Pa·s at 25° C. is desirable, and a viscosity in the range of 0.10 to 10 Pa·s is especially desirable. The reasons for this are as follows: i.e., if the above-mentioned viscosity is less than the lower limit of the above-mentioned range, the mechanical strength of the cured silicone polymer that is obtained tends to drop; on the other hand, if the viscosity exceeds the upper limit of the above-mentioned range, the handling and working characteristics of the heat-conducting silicone polymer composition that is obtained tend to deteriorate.

Examples of organopolysiloxanes which can be used in the above-mentioned component (A) include dimethylsiloxane-methyl vinylsiloxane copolymers in which both ends of the molecular chains are closed by trimethylsiloxy groups, methylphenylpolysilane in which both ends of the molecular chains are closed by trimethyl siloxy groups, methylvinylsiloxane-methylphenylsiloxane copolymers in which both ends of the molecular chains are closed by trimethylsiloxy groups, dimethylsiloxane-methylvinylsiloxane-methylphenylsiloxane copolymers in which both ends of the molecular chains are closed by trimethylsiloxy groups, dimethylpolysiloxane in which both ends of the molecular chains are closed by dimethylvinylsiloxy groups, methylphenylpolysilane in which both ends of the molecular chains are closed by dimethylvinylsiloxy groups, methylphenyl polysiloxanes in which both ends of the molecular chains are closed by dimethylvinylsiloxy groups, dimethylsiloxane-methylvinylsiloxane copolymers in which both ends of the molecular chains are closed by dimethylvinylsiloxy groups, dimethylsiloxane-methylphenylsiloxane copolymers in which both ends of the molecular chains are closed by dimethylvinylsiloxy groups, dimethylsiloxane-methylvinylsiloxane copolymers in which both ends of the molecular chains are closed by dimethylhydroxysiloxy groups, methylphenylpolysilane in which both ends of the molecular chains are closed by dimethylhydroxysiloxy groups, dimethylsiloxane-methylvinylsiloxane-methylphenylsiloxane copolymers in which both ends of the molecular chains are closed by dimethylhydroxysiloxy groups, organopolysiloxanes having $R_3SiO_{1/2}$ units and $SiO_{4/2}$ units, organopolysiloxanes having $RSiO_{3/2}$ units, organopolysiloxanes having $R_2SiO_{2/2}$ units and $RSiO_{3/2}$ units, organopolysiloxanes having $R_2SiO_{2/2}$ units, $RSiO_{3/2}$ units and $SiO_{4/2}$ units, and mixtures containing two or more of these organopolysiloxanes. R in the above-mentioned organopolysiloxanes indicates a substituted or unsubstituted monovalent hydrocarbon group; examples of such groups include alkyl groups such as methyl groups, ethyl groups, propyl groups, butyl groups, pentyl groups and hexyl groups, etc.; alkenyl groups such as vinyl groups, allyl groups, butenyl groups, pentenyl groups and hexenyl groups, etc.; aryl groups such as phenyl groups, tolyl groups and xylyl groups, etc.; aralkyl groups such as benzyl groups and phenethyl groups, etc.; and halogenated alkyl groups such as 3-chloropropyl groups and 3,3,3-trifluoropropyl groups, etc. However, it is necessary that at least two of the R groups in such organopolysiloxanes be alkenyl groups.

The organopolysiloxane of component (B) is a curing agent for the above-mentioned composition, and must have at least two hydrogen atoms bonded to silicon atoms per molecule. Examples of groups other than hydrogen atoms which may be bonded to the silicon atoms in component (B) include substituted or unsubstituted monovalent hydrocarbon groups, e.g., alkyl groups such as methyl groups, ethyl groups, propyl groups, butyl groups, pentyl groups and hexyl groups, etc.; aryl groups such as phenyl groups, tolyl groups and xylyl groups, etc.; aralkyl groups such as benzyl groups and phenethyl groups, etc.; and halogenated alkyl groups such as 3-chloropropyl groups and 3,3,3-trifluoropropyl groups, etc.; alkoxy groups such as methoxy groups, ethoxy groups and propoxy groups, etc.; and hydroxy groups. In particular, methyl groups or phenyl groups are especially desirable. Furthermore, there are no restrictions on the molecular structure of component (B); examples of molecular structures which may be used include linear structures, linear structures with some branching, branched structures and network structures. Likewise, there are no restrictions on the viscosity of component (B); for example, a viscosity in the range of 0.001 to 50 Pa·s at 25° C. is desirable, and a viscosity in the range of 0.005 to 1 Pa·s is especially desirable. The reasons for this are as follows: i.e., if the above-mentioned viscosity is less than the lower limit of the above-mentioned range, the mechanical strength of the cured silicone polymer that is obtained tends to drop; on the other hand, if the viscosity exceeds the upper limit of the above-mentioned range, the handling and working characteristics of the heat-conducting silicone polymer composition that is obtained tend to deteriorate.

Examples of organopolysiloxanes which can be used in the above-mentioned component (B) include methylhydridopolysiloxanes in which both ends of the molecular chains are closed by trimethylsiloxy groups, dimethylsiloxane-meihylhydridosiloxane copolymers in which both ends of the molecular chains are closed by trimethylsiloxy groups, methylhydridosiloxane-methylphenylsiloxane copolymers in which both ends of the molecular chains are closed by trimethylsiloxy groups, dimethylsiloxane-methylhydridosiloxane-methylphenylsiloxane copolymers in which both ends of the molecular chains are closed by trimethylsiloxy groups, dimethylpolysiloxane in which both ends of the molecular chains are closed by dimethylhydridosiloxy groups, methylhydridopolysiloxanes in which both ends of the molecular chains are closed by dimethylhydridosiloxy groups, dimethylsiloxane-methylhydrido-siloxane copolymers in which both ends of the molecular chains are closed by dimethyl-hydridosiloxy groups, dimethylsiloxane-methylphenylsiloxane copolymers in which both ends of the molecular chains are closed by dimethylhydridosiloxy groups, methylphenyl polysiloxanes in which both ends of the molecular chains are closed by dimethylhydrido-siloxy groups, methylhydridopolysiloxanes in which both ends of the molecular chains are closed by dimethylhydroxysiloxy groups, dimethylsiloxane-methylhydridosiloxane copolymers in which both ends of the molecular chains are closed by dimethylhydroxysiloxy groups, methylhydridosiloxane-methylphenylsiloxane copolymers in which both ends of the molecular chains are closed by dimethyl-hydroxysiloxy groups, dimethylsiloxane-methylhydridosiloxane-methylphenylsiloxane copolymers in which both ends of the molecular chains are closed by dimethylhydroxysiloxy groups, and mixtures containing two or more of these organopolysiloxanes.

The amount of component (B) that is mixed with the above-mentioned composition is an amount that is sufficient to cure the composition; in concrete terns, it is desirable that the amount used be such that the number of hydrogen atoms bonded to silicon atoms in component (B) is 0.1 to 20 (preferably 0.5 to 10, and even more preferably 0.5 to 5) for each alkenyl group in component (A). The reasons for this are as follows: i.e., if the amount used is such that the number of hydrogen atoms bonded to silicon atoms in component (B) relative to the alkenyl groups in component (A) is less than the lower limit of the above-mentioned range, the heat-conducting silicone polymer composition that is obtained tends not to be sufficiently cured; on the other hand, if the amount used is such that the above-mentioned number of atoms exceeds the upper limit of the above-mentioned range, the heat resistance of the cured silicone polymer that is obtained tends to drop.

The hydrosilylation catalyst of component (C) is a catalyst which is used to accelerate the curing of the above-mentioned composition. Examples of catalysts which can be used include platinum type catalysts, rhodium type catalysts and palladium type catalysts. Platinum type catalysts are preferable. Examples of such platinum type catalysts include platinum black, platinum supported on powdered alumina, platinum supported on powdered silica, platinum supported on powdered carbon, chloroplatinic acid, alcohol solutions of chlorplatinic acid, olefin complexes of platinum and, alkenylsiloxane complexes of platinum. In addition, particles of thermoplastic resins such as methyl methacrylate resins, polycarbonates, polystyrenes or silicone resins, etc., which contain such platinum type catalysts may also be used.

The amount of component (C) that is mixed with the above-mentioned composition is an amount that is sufficient to accelerate the curing of the composition. In cases where a platinum type catalyst is used as component (C), it is desirable that the amount used be such that the amount of platinum metal contained in component (C) is in the range of 0.1 to 1,000 ppm (in weight units), and preferably in the range of 1 to 500 ppm, relative to the total amount of component (A) and component (B). The reasons for this are as follows: i.e., if the amount of platinum contained in component (C) relative to the total amount of component (A) and component (B) is less than the lower limit of the above-mentioned range, the heat-conducting silicone polymer composition that is obtained tends to be insufficiently cured; on the other hand, if this amount exceeds the upper limit of the above-mentioned range, the cured silicone polymer that is obtained may be colored.

Furthermore, adhesion promoting agents, which are used to endow the silicone polymer that is obtained with good adhesive properties, may be mixed with the above-mentioned composition as optional components. Examples of such adhesion promoting agents include alkoxysilane compounds such as vinyltrimethoxysilane, vinyl-triethoxysilane, methylvinyldimethoxysilane, methylvinyldiethoxr-silane, allyltrimethoxysilane, allyltri-ethoxysilane and 3-glycidoxypropylvinyldimethoxysilane, etc., and organo-silicon compounds which have alkoxy groups bonded to the silicon atoms, e.g., dimethylpolysiloxane which can be expressed by the formula

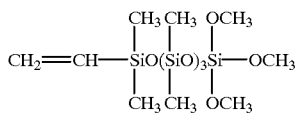

dimethylpolysiloxane which can be expressed by the formula

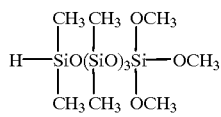

methylvinylsiloxane-dimethylsiloxane copolymers which can be expressed by the general formula

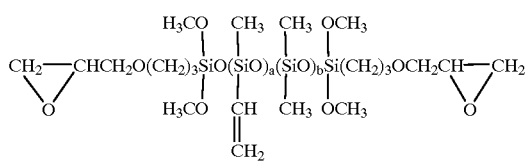

(in the above formula, a is an integer equal to or greater than 1, and b is an integer equal to or greater than 1), methylhydridosiloxane-methyl(trimethoxysilylethyl) siloxane cyclic compounds which can be expressed by the formula

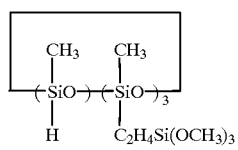

and organopolysiloxanes which can be expressed by the following general formula

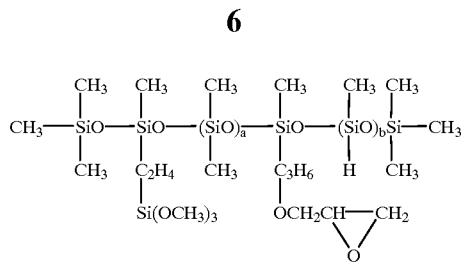

(in the above formula, a is an integer equal to or greater than 1, and b is an integer equal to or greater than 1), etc.

The amount of such adhesion promoting agent(s) that is mixed with the above-mentioned composition is arbitrary; however, from the standpoint of inhibiting gelation of the resulting heat-conducting silicone polymer composition during storage, it is desirable that the amount be 20 parts by weight or less per 100 parts by weight of component (A); furthermore, an amount in the range of 0.1 to 10 parts by weight is desirable from the standpoint of endowing the resulting cured silicone polymer with favorable adhesive characteristics.

Furthermore, curing inhibitors which are used for the purpose of inhibiting curing of the heat-conducting silicone polymer composition during storage may be mixed with the above-mentioned composition as optional components. Examples, of such curing inhibitors include alkyne alcohols such as 3-methyl-1-butyn-3-ol, 3,5-dimethyl-1-hexyn-3-ol and phenylbutynol, etc.; "enyne" compounds such as 3-methyl-3-buten-1-yne and 3,5-dimethyl-3-hexen-1-yne, etc.; alkenylsiloxane compounds such as 1,3,5,7-tetramethyl 1,3,5,7-tetravinylcyclotetrasiloxane and 1,3,5,7-tetramethyl-1,3,5,7-tetrahexenylcyclotetrasiloxane, etc.; and benzotriazole. The amount of such curing inhibitor(s) that is mixed with the above-mentioned composition is arbitrary; however, from the standpoint of inhibiting curing of the resulting heat-conducting silicone polymer composition during storage, and from the standpoint of allowing rapid curing at relatively low temperatures, it is desirable that the amount used be in the range of 0.001 to 5 parts by weight per 100 parts by weight of component (A).

Furthermore, inorganic fillers may be mixed with the above-mentioned composition as optional components for the purpose of endowing the resulting cured silicone polymer with an appropriate hardness and mechanical strength. Examples of such inorganic fillers include fumed silica, crystalline silica, calcined silica, wet-process 3 silica, fumed titanium oxide, carbon black and fillers prepared by treating the surfaces of the above-mentioned fillers with organo-silicon compounds such as organoalkoxysilanes, organochlorosilanes or organodisilazanes, etc. In particular, fumed silica is especially desirable, since this filler can inhibit precipitation of the heat-conducting metal powder in the heat-conducting silicone polymer composition. The amount of such inorganic filler(s) that is mixed with the above-mentioned composition is arbitrary; however, from the standpoint of endowing the resulting cured silicone polymer with an appropriate hardness and mechanical strength, and also from the standpoint of preventing a deterioration in the handling and working characteristics of the resulting heat-conducting silicone polymer composition, it is desirable that the amount added be 50 parts by weight or less per 100 parts by weight of component (A).

Furthermore, the metal powder that is dispersed in the heat-conducting polymer composition of the present invention is characterized by the fact that said powder has a metal oxide layer and/or a metal nitride layer on the surfaces of the powder particles. Examples of powdered metals which can be used in this case include aluminum, copper, titanium, beryllium, magnesium, silicon, iron and mixtures containing of two or more of these metals. In particular, aluminum is especially desirable. Furthermore, oxides of the above-mentioned metals may be cited as examples of metal oxides which can be used as the metal oxide layer on the surfaces of the metal powder; in particular, it is desirable that the metal of the metal oxide be of the same type as the metal of the metal powder. Moreover, nitrides of the above-mentioned metals may be cited as examples of metal nitrides which can be used as the metal nitride layer on the surfaces of the metal powder; in particular, it is desirable that the metal of the metal nitride be of the same type as the metal of the metal powder. There are no restrictions on the thickness of the metal oxide layer and/or metal nitride layer formed on the surfaces of the metal powder; however, it is desirable that this thickness be 0.1 microns or less. The metal oxide layer and/or metal nitride layer formed on the surfaces of the metal powder can be confirmed by examining the surfaces of the metal powder by XPS (X-ray photoelectron spectroscopy), etc.

There are no restrictions on the particle size of the above-mentioned metal powders; however, from the standpoint of good dispersibility in the polymer, it is desirable that the mean particle size be in the range of 0.1 to 50 microns. Furthermore, there are no restrictions on the shape of the metal powder particles; examples of shapes which can be used include flake-form, substantially spherical, completely spherical, fiber-form, needle-form and amorphous particle shapes. Furthermore, the metal powder used may be a mixture of particles with two or more different shapes of the types described above.

In regard to the method used to prepare the above-mentioned metal powder, it is desirable that a metal powder be prepared by a granulation method, atomization method or reduction method, etc., and that this metal powder then be granulated by means of a granulating device such as a stamp mill, ball mill, vibrating mill, hammer mill, rolling rollers or mortar, etc. When this metal powder is granulated, and especially in cases where this metal powder is formed into flake-form particles, it is desirable that a higher fatty acid such as oleic acid or stearic acid, etc., be used as a lubricant. However, since such lubricants are adsorbed on the surfaces of the metal powder particles following granulation, it is desirable to remove such lubricants if necessary.

In regard to the method used to form a metal oxide layer and/or a metal nitride layer on the surfaces of the particles of the metal powder prepared as described above, it is desirable to use a method in which the metal powder is heated in oxygen or a method in which the metal powder is heated in nitrogen. If such a method is used, the following advantage can also be obtained: i.e., the lubricant adsorbed on the surfaces of the metal powder particles granulated by the method described above can be stripped away. Another method which can be used is a method in which the metal powder is subjected to anodic oxidation in a solution of nitric acid, sulfuric acid or oxalic acid, etc. Especially in the case of metal powders such as powdered aluminum, etc., which are relatively easily oxidized or nitrided, a metal oxide layer and/or a metal nitride layer can easily be formed on the surfaces of the powder particles by heating the powder in oxygen or nitrogen.

In the heat-conducting polymer composition of the present invention, there are no restrictions on the amount of metal powder that can be mixed with the composition; however, it is desirable that the amount of metal powder used be in the range of 10 to 850 parts by weight per 100 parts by weight of polymer. Furthermore, an amount in the range of 50 to 850 parts by weight is even more desirable, and an amount in the range of 50 to 600 parts by weight is especially desirable. The reasons for this are as follows: i.e., if the amount of metal powder that is added per 100 parts by weight of the above-mentioned polymer is less than the lower limit of the above-mentioned range, the thermal conductivity of the heat-conducting polymer composition that is obtained tends to drop; on the other hand, if this amount exceeds the upper limit of the above-mentioned range, the handling and working characteristics of the heat-conducting polymer composition that is obtained tend to deteriorate.

In regard to the method used to mix the metal powder with the polymer, the polymer and the metal powder may be mixed by means of a mixing device such as a two-roll mill, three-roll mill, kneader mixer, Ross mixer, planetary mixer, intermixer or Banbury mixer, etc. Furthermore, a solvent may be used during the mixing of the metal powder with the polymer and then removed following mixing.

The heat-conducting polymer composition of the present invention has a superior thermal conductivity, and also has electrical insulating properties. Accordingly, the composition of the present invention is useful as a heat-conducting insulating grease for use in electrical and electronic applications, as a heat-conducting insulating potting agent for use in electrical and electronic applications, and as a heat-conducting insulating bonding agent for use in electrical and electronic applications. Furthermore, the composition of the present invention is also useful as a raw material for the manufacture of heat-conducting insulating sheets for use in electrical and electronic applications. Moreover, in cases where such a heat-conducting polymer composition or heatconducting insulating sheet is used to connect heat-generating semiconductor elements such as power transistors or IC's, etc., to substrates (consisting of ceramics, etc.), lead frames, heat-dissipating fins or metal heat-dissipating plates, etc., or is used for the sealing or filling of such semiconductor elements, efficient heat dissipation can be achieved, so that the operating stability of electrical or electronic parts can be improved.

EXAMPLES

The heat-conducting polymer composition of the present invention will be described in greater detail in terms of practical examples of application. Furthermore, the physical characteristics described in the practical examples are values at 25° C., and the storage stability of the heat-conducting polymer composition and the volume resistivity and thermal conductivity of the cured composition were measured as described below.

Storage Stability of Heat-Conducting Polymer Composition

After the heat-conducting polymer composition was prepared by uniformly mixing a metal powder with a polymer, this composition was stored under refrigeration (approximately 5° C.) in a transparent glass bottle, and the external appearance was observed.

Volume Resistivity of Cured Composition

The heat-conducting polymer composition was cured by a prescribed method, thus preparing a cured product with a thickness of 1 mm or greater. The volume resistivity of this cured product was measured by the method stipulated in JIS C 2123. Furthermore, the measurement voltage was set at 50 V.

Thermal Conductivity of Cured Composition

The thermal conductivity of a cured product obtained by curing the heat-conducting polymer composition by a prescribed method was measured by means of a rapid thermal conductivity meter (QTM-500 manufactured by Kyoto Denshi Kogyo K.K.; probe method (non-steady hot wire method)).

Reference Example 1

An aluminum ingot was melted at 800° C., and this molten metal was sprayed into argon gas and then classified to produce a substantially spherical aluminum powder with a mean particle size of 5 microns. In a xylene solution with a small amount of oleic acid added as a lubricant, this aluminum powder was converted into a flake-form powder by means of a ball mill. The flake-form aluminum powder thus obtained was heated in air at 200 to 250° C., thus removing the oleic acid adsorbed on the particle surfaces so that the aluminum exposed at said surfaces was oxidized. The extent of this oxidation was confirmed by X-ray photoelectron spectroscopy (hereafter referred to as "XPS"). Next, this aluminum powder was classified, thus producing a flake-form aluminum powder which had a mean particle size of 10 microns and which had an aluminum oxide layer on the surfaces of the particles.

Reference Example 2

An aluminum ingot was melted at 800° C., and this molten metal was sprayed into argon gas and then classified to produce a substantially spherical aluminum powder with a mean particle size of 5 microns. In a xylene solution with a small amount of oleic acid added as a lubricant, this aluminum powder was converted into a flake-form powder by means of a ball mill. The flake-form aluminum powder thus obtained was heated in nitrogen at 200 to 250° C., thus removing the oleic acid adsorbed on the particle surfaces so that the aluminum exposed at said surfaces was nitrided. The extent of this nitriding was confirmed by XPS. Next, this aluminum powder was classified, thus producing a flake-form aluminum powder which had a mean particle size of 10 microns and which had an aluminum nitride layer on the surfaces of the particles.

Reference Example 3

An aluminum ingot was melted at 800° C., and this molten metal was sprayed into argon gas and then classified to produce a substantially spherical aluminum powder with a mean particle size of 5 microns. This aluminum powder was heated in air at 200 to 250° C., so that the aluminum at the surface was oxidized. The extent of this oxidation was confirmed by XPS.

Reference Example 4

An aluminum ingot was melted at 800° C., and this molten metal was sprayed into argon gas and then classified to produce a substantially spherical aluminum powder a mean particle size of 5 microns. In a xylene solution with an acrylic resin added as a lubricant, this aluminum powder was converted into a flake-form powder by means of a ball mill. This aluminum powder was classified, thus producing a flake-form aluminum powder which had a mean particle size of 10 microns and which hid an acrylic resin layer on the surfaces of the particles.

TABLE 1

| | Division | | | |
|---|---|---|---|---|
| Metal powder | Reference Example 1 | Reference Example 2 | Reference Example 3 | Reference Example 4 |
| Type | Aluminum | Aluminum | Aluminum | Aluminum |
| Surface | Aluminum oxide layer | Aluminum nitride layer | Aluminum oxide layer | Acrylic resin layer |
| Mean particle size ($\mu$m) | 10 | 10 | 5 | 10 |
| Shape | Flake-form | Flake-form | Substantially spherical | Flake-form |

Practical Example 1

100 parts by weight of a dimethylpolysiloxane in which both ends of the molecular chains were closed by dimethylvinylsiloxy groups (vinyl group content 0.4 wt %), and which had a viscosity of 0.50 Pa·s, 2 parts by weight of a methylhydridopolysiloxane in which both ends of the molecular chains were closed by trimethylsiloxy groups (content of hydrogen atoms bonded to silicon atoms=1.5 wt %), and which had a viscosty of 0.030 Pa·s, 7 parts by weight of 3-glycidoxypropyltrimethoxysilane, 85 parts by weight of the aluminum powder prepared in Reference Example 1, a prescribed amount of a 1,3-divinyl-1,1,3,3-tetramethy complex of platinum (used in an amount which was such that the concentration of the platinum metal in this complex relative to the above-mentioned dimethylpolysiloxane was 5 ppm in weight units) and a prescribed amount of phenylbutynol (used in an amount which was such that the concentration relative to the above-mentioned dimethylpolysiloxane was 300 ppm in weight units) were uniformly mixed to produce a heat-conducting silicone polymer composition. The storage stability of this heat-conducting silicone polymer composition was observed; furthermore, the volume resistivity and thermal conductivity of a rubber-form cured heat-conducting silicone polymer which was cured by heating the above-mentioned heat-conducting silicone polymer composition for 30 minutes at 150° C. were measured. The results obtained are shown in Table 2.

Practical Example 2

A heat-conducting silicone polymer composition was prepared in the same manner as in Practical Example 1, except that the aluminum powder prepared in Reference Example 2 was mixed (in the same amount) with the heat-conducting silicone polymer composition of Practical Example 1 instead of the aluminum powder prepared in Reference Example 1. The storage stability of this heat-conducting silicone polymer composition was observed; furthermore, the volume resistivity and thermal conductivity of a rubber-form cured heat-conducting silicone polymer which was cured by heating the above-mentioned heat-conducting silicone polymer composition for 30 minutes at 150° C. were measured. The results obtained are shown in Table 2.

Practical Example 3

100 parts by weight of a dimethylpolysiloxane in which both ends of the molecular chains were closed by dimethylvinylsiloxy groups (vinyl group content=0.4 wt. %), and which had a viscosity of 0.50 Pa·s, 6 parts by weight of a mixture of a dimethylpolysiloxane in which both ends of the molecular chains were closed by dimethylvinylsiloxy groups and [b] an organopolysiloxane consisting of $(CH_3)_3SiO_{1/2}$ units, $(CH_2=CH)(CH_3)_2SiO_{1/2}$ units and $SiO_{4/2}$ units (vinyl group content=0.8 wt %), which had a viscosity of 8 Pa·s, 2.5 parts by weight of a methylhydridopolysiloxane in which both ends of the molecular chains were closed by trimethylsiloxy groups (content of hydrogen atoms bonded to silicon atoms=1.5 wt %), and which had a viscosity of 0.030 Pa·s, 15 parts by weight of a dimethylpolysiloxane in which both ends of the molecular chains were closed by dimethylhydridosiloxy groups (content of hydrogen atoms bonded to silicon atoms=0.12 wt %), and which had a viscosity of 0.015 Pa·s, 6 parts by weight of a dimethylpolysiloxane expressed by the formula

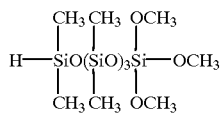

50 parts by weight of the aluminum powder prepared in Reference Example 2, 300 parts by weight of the aluminum powder prepared in Reference Example 3, 1.5 parts by weight of fumed silica which had a BET specific surface area of 200 m²/g and whose particle surfaces had been treated with hexamethyldisilazane, a prescribed amount of a 1,3-divinyl-1,1,3,3-tetramet complex of platinum (used in an amount which was such that the concentration of the platinum metal in this complex relative to the above-mentioned dimethylpolysiloxane was 5 ppm in weight units) and a prescribed amount of phenylbutynol (used in an amount which was such that the concentration relative to the above-mentioned dimethylpolysiloxane was 300 ppm in weight units) were uniformly mixed to produce a heat-conducting silicone polymer composition. The storage stability of this heat-conducting silicone polymer composition was observed; furthermore, the volume resistivity and thermal conductivity of a rubber-form cured heat-conducting silicone polymer which was cured by heating the above-mentioned heat-conducting silicone polymer composition for 30 minutes at 150° C. were measured. The results obtained are shown in Table 2.

Comparative Example 1

A heat-conducting silicone polymer composition was prepared in the same manner as in Practical Example 1, except that an amorphous aluminum oxide (alumina) powder with a mean particle size of 10 microns was mixed (in the same amount) with the heat-conducting silicone polymer composition of Practical Example 1 instead of the aluminum powder prepared in Reference Example 1. The storage stability of this heat-conducting silicone polymer composition was observed; furthermore, the volume resistivity and thermal conductivity of a rubber-form cured heat-conducting silicone polymer which was cured by heating the above-mentioned heat-conducting silicone polymer composition for 30 minutes at 150° C. were measured. The results obtained are shown in Table 2.

Comparative Example 2

A heat-conducting silicone polymer composition was prepared in the same manner as in Practical Example 1, except that the aluminum powder prepared in Reference Example 4 was mixed (in the same amount) with the heat-conducting silicone polymer composition of Practical Example 1 instead of the aluminum powder prepared in Reference Example 1. The storage stability of this heat-conducting silicone polymer composition was observed; furthermore, the volume resistivity and thermal conductivity of a rubber-form cured heat-conducting silicone polymer which was cured by heating the above-mentioned heat-conducting silicone polymer composition for 30 minutes at 150° C. were measured. The results obtained are shown in Table 2.

TABLE 2

| | Division | | | | |
|---|---|---|---|---|---|
| Items | Practical Example 1 | Practical Example 2 | Practical Example 3 | Comparative Example 1 | Comparative Example 2 |
| Type of heat-conducting powder | Reference Example 1 | Reference Example 2 | Reference Example 2 Reference Example 3 | Alumina powder | Reference Example 4 |
| Storage stability of heat-conducting silicone polymer composition | | | | | |
| Initial | Uniform | Uniform | Uniform | Uniform | Uniform |
| After being allowed to stand for 1 month | Uniform | Uniform | Uniform | Uniform | Layer separation |
| After being allowed to stand for 3 months | Uniform | Uniform | Uniform | Uniform | Layer separation |
| After being allowed to stand for 6 months | Uniform | Uniform | Uniform | Layer separation | Layer separation |
| Volume resistivity of cured silicone polymer (ohm/cm³) | 7.03E + 14 | 7.03E + 14 | 7.02E + 14 | 3.0E + 15 | 6.5E + 14 |
| Thermal conductivity of cured silicone polymer (W/° C. − m) | 2.10 | 2.15 | 2.03 | 1.50 | 1.95 |

The heat-conducting polymer composition of the present invention is characterized by the fact that said composition has a superior storage stability and thermal conductivity, and also by the fact that said composition has electrical insulating properties.

That which is claimed is:

1. A heat-conducting polymer composition, comprising a silicone polymer and a heat-conducting metal powder, wherein the metal powder comprises a metal having a surface layer selected from the group consisting of metal oxides, metal nitrides and mixtures thereof.

2. The composition according to claim 1, wherein the silicone polymer is a curable silicone polymer.

3. The composition according to claim 2, wherein the curable silicone polymer is a hydrosilylation reaction-curable silicone polymer.

4. The composition according to claim 3, wherein the hydrosilation reaction-curable silicone polymer comprises:

(A) an organopolysiloxane having at least two alkenyl groups per molecule;

(B) an organopolysiloxane having at least two hydrogen atoms bonded to silicon atoms per molecule; and (C) a hydrosilylation reaction catalyst.

5. The composition according to claim 4, wherein component (A) contains organic groups selected from the group consisting of methyl and phenyl.

6. The composition according to claim 4, wherein component (A) has a viscosity of from 0.10 to 10 Pa·s.

7. The composition according to claim 4, wherein component (B) contains organic groups selected from the group consisting of methyl and phenyl.

8. The composition according to claim 4, wherein component (B) has a viscosity of from 0.005 to 1 Pa·s.

9. The composition according to claim 4, wherein component (C) is a platinum catalyst.

10. The composition according to claim 9, wherein the platinum catalyst is contained in a thermoplastic resin.

11. The composition according to claim 4, further comprising in adhesion promoter.

12. The composition according to claim 11, wherein the adhesion promoter is an alkoxysilane.

13. The composition according to claim 4, further comprising a curing inhibitor.

14. The composition according to claim 4, further comprising an inorganic filler.

15. The composition according to claim 14, wherein the inorganic filler is fumed silica.

16. The composition according to claim 2, wherein the metal powder comprises a metal selected from the group consisting of aluminum, copper, titanium, beryllium, magnesium, silicon, iron, and mixtures thereof.

17. The composition according to claim 16, wherein the metal is aluminum.

18. The composition according to claim 2, wherein the surface layer is a metal oxide containing the same metal as the metal of the metal powder.

19. The composition according to claim 2, wherein the surface layer is a metal nitride containing the same metal as the metal of the metal powder.

20. The composition according to claim 2, wherein the surface layer is a metal oxide having a thickness not greater than 0.1 microns.

21. The composition according to claim 2, wherein the surface layer is a metal nitride having a thickness not greater than 0.1 micron.

22. The composition according to claim 2, wherein the metal powder has a mean particle size of from 0.1 to 50 microns.

23. A cured composition, comprising a reaction product of the composition of claim 2.

24. A cured composition, comprising a reaction product of the composition of claim 4.

25. The composition according to claim 2, wherein the composition is disposed on a semiconductor element.

26. The composition according to claim 4, wherein the composition is disposed on a semiconductor element.

27. A method of preparing a heat-conducting polymer composition, comprising mixing a silicone polymer with a heat-conducting metal powder, wherein the metal powder comprises a metal having a surface layer selected from the group consisting of metal oxides, metal nitrides, and mixtures thereof.

28. The method according to claim 27, wherein the silicone polymer is a hydrosilylation reaction-curable silicone polymer.

29. The method according to claim 28, wherein the hydrosilylation reaction-curable silicone polymer comprises:

(A) an organopolysiloxne having at least two alkenyl groups per moleecule;

(B) an organopolysiloxne having at least two hydrogen atoms boned to silicon atoms per molecule; and (C) a hydrosilylation reaction catalyst.

30. The composition according to claim 2, wherein the metal powder comprises aluminum having a surface layer of aluminum oxide.

31. The composition according to claim 2, wherein the metal powder comprises aluminum having a surface layer of aluminum nitride.

* * * * *